P. H. FRANZ.
FRICTION SURFACE AND METHOD OF FORMING SAME.
APPLICATION FILED DEC. 21, 1914.
1,155,054.                    Patented Sept. 28, 1915.
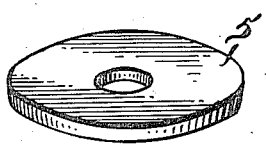
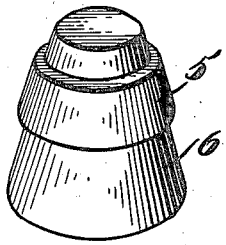
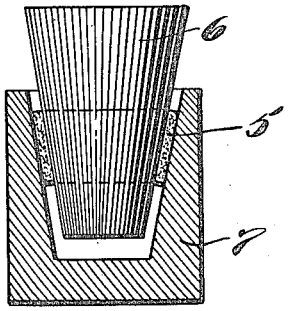
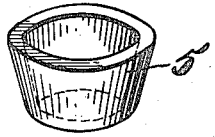
Inventor
Paul H. Franz

UNITED STATES PATENT OFFICE.

PAUL H. FRANZ, OF DOLGEVILLE, NEW YORK, ASSIGNOR TO DANIEL GREEN FELT SHOE COMPANY, OF BOSTON, MASSACHUSETTS, A CORPORATION OF MASSACHUSETTS.

FRICTION-SURFACE AND METHOD OF FORMING SAME.

1,155,054.  Specification of Letters Patent.  Patented Sept. 28, 1915.

Application filed December 21, 1914. Serial No. 878,328.

*To all whom it may concern:*

Be it known that I, PAUL H. FRANZ, a citizen of the United States, and a resident of Dolgeville, in the county of Herkimer and State of New York, have invented certain new and useful Improvements in Friction-Surfaces and Methods of Forming Same, of which the following is a specification.

In the formation of linings for brake bands, flat or cone-shaped clutch rings or like frictional surfaces, it is essential for the advantageous operation of such mechanisms that the frictional surfaces have a perfect fit when brought into operative contact, that is to say, their operating surfaces, when engaged, should contact with substantial equal pressure over the entire area of the respective faces, and not in isolated portions, as so often occurs where linings of leather or other similar materials are employed.

My invention relates, therefore, to the formation of friction surfaces which may be used in clutches, brakes and the like, and consists in so forming and compressing a cloth fabric, such as an all-wool felt, to the shape required for such clutch or brake lining, and thereafter impregnating same with a solution of suitable resinous substances which shall become viscous under frictional heat and which shall not only increase the positive frictional grip of the surfaces when brought into contact, but also the durability of the lining of such friction surfaces through the perfect fit obtainable by the use of my improved method in forming and hardening same. After the felt has been impregnated with the solution as hereinafter described, the facing is compressed and allowed to dry and harden, when it will retain its shape and general contour and will be found in use to have greater durability and effectiveness than other clutch and brake linings now in common use. For example, I have employed the following method in making my improved frictional surface as the facing of a cone clutch:—It is very important in my process that the felt shall be shrunk to reduce same in size, and hardened to the shape and form desired. In doing this, I first place a suitably cut piece of felt on the male member of a clutch; such piece may be cut too large or it may be cut too small; after it is placed on the male part, the felt facing is thoroughly soaked in hot water and the male part of the clutch is then forced into the female part and the two parts are thereafter secured together. The felt facing is then dried by the application of heat, the felt shrinking in all directions and conforming to the contour of the clutch through the contraction or curling up of the individual fibers of the matted wool comprising the felt fabric. My reason for thus shrinking the felt facing is to get a tight fit upon the male part of the clutch, and my reason for forcing it into the female part of the clutch is to cause it to be tightly secured to the male part, and there let it shrink to form in contact with the female part of the clutch surface thereby to obtain a perfect fitting friction surface which shall be symmetrical throughout the entire facing and of substantial uniform texture, the fibers of the felt having contracted in the shrinking. When this facing or lining is thoroughly shrunk and dried, I remove same from the clutch and apply thereto the following solution:—I first take thirty (30) pounds of shellac and mix it with five (5) gallons of wood alcohol, and heat same to the neighborhood of 150 degrees Fahrenheit; I then mix twelve (12) pounds of powdered rosin with three (3) gallons of turpentine and heat same to the neighborhood of 95 degrees Fahrenheit. After the above combinations are heated to their respective temperatures as hereinbefore set forth, I pour them into a suitable receptacle and mix them together, constantly stirring the mixture during their union; and I then gently boil same for about ten minutes. The solution is now ready to be applied to the facing or lining, or it can be further reduced with alcohol, depending on the purpose for which the felt clutch facing or brake lining is to be used; but the solution should always be applied in a warm state. This impregnating solution is applied to the lining or facing either by immersing the felt after molding it to form, or it can be applied with a brush without removing same from the clutch. I have found that the first method of application is the most preferable, where a positive and immediate action in the clutch or brake is required, whereas the second method of application by a brush is entirely satisfactory on a common friction clutch where a gradual engagement with a certain amount of slipping between the surfaces is necessary and desirable. The solution can be applied to any friction fabric, at any time when the same gives evidence of slipping, either by wear, or by unavoidable oil lubrication from the machinery in which such friction surface may be used.

After the facing or lining has had the solution hereinbefore described applied thereto, it is again fastened to the male clutch member and forced into the female part of the clutch which has the effect of spreading the preparation through and over the felt facing or lining, and allowed to dry. After it is completely dried this frictional surface will be found to be sufficiently hard to hold its shape, and can be removed and thereafter attached to any clutch of the same dimensions and contour as the one upon which it was shrunk to form and impregnated with the solution as hereinbefore set forth.

In making linings for brakes it is advisable to stretch the felt thoroughly before applying the solution, and, in making frictional disks, the felt may be cut to the form of such disk, and thereafter saturated with such preparation and then pressed under heat to the required thickness.

The proportions of the substances in the impregnating solution used, which I have hereinbefore stated, may be varied within considerable limits, depending entirely on the result desired from the frictional surface to be employed in any mechanism, as it is obvious that other proportions can be employed according to special conditions or as to the object to be attained. If a very positive frictional engagement is desired, a correspondingly thick solution of shellac, properly heated to penetrate in all the fibers or interstices of the felt, must be employed, whereas the thinner the solution of shellac, the less will be the frictional power of the facing or lining.

The friction caused by the engaging of the felt facing of the male member with the female member of my clutch causes the shellac to become sticky between the clutch faces. The rosin in such prepared felt faces is also warmed and becomes sticky for the same reason as the shellac. I therefore put the rosin in the solution because it will combine with the oil which is likely to leak into the clutch during the operation of the machine to which the clutch may be attached, and the oil and rosin combined, under the heat of friction, also makes a sticky frictional surface which will cause a perfect clutch or brake, even if the felt facing is entirely covered with oil.

By the use of the term "impregnating" the felt fabric it is not intended to limit the scope of this invention to immersing and saturating the fabric in the resinous solution, but such term includes the application of the solution to the fabric by use of a brush or any other suitable means.

The accompanying drawings illustrate one form of apparatus for carrying out my improved method in forming the friction surfaces for a cone clutch embodying my invention.

Figure 1 is a perspective view of a felt disk 5 cut to form the facing of a cone clutch; Fig. 2 is a similar view showing the disk 5 mounted on the cone-shaped male member 6 of the clutch; Fig. 3 is a view partly in cross section showing the disk 5 compressed between the male member 6 and the female member 7 of the clutch; and Fig. 4 is a perspective view of the friction surface finally formed and ready to be used as the facing of a cone clutch.

I claim as my invention:—

1. The method of forming friction surfaces from a felt fabric, which consists in shrinking the felt fabric to form, then impregnating the shrunk felt fabric with a solution of resinous substances, and finally drying under pressure the impregnated fabric.

2. The method of forming friction surfaces from a felt fabric, which consists in shrinking the felt fabric to form, then impregnating the shrunk felt fabric with a heated solution of resinous substances, and finally drying under pressure the impregnated fabric.

3. The method of forming friction surfaces from a felt fabric, which consists in shrinking the felt fabric to form, then impregnating the shrunk felt fabric with a solution of resinous substances comprising shellac and rosin, and finally drying under pressure the impregnated fabric.

4. The method of forming friction surfaces from a felt fabric, which consists in shrinking the felt fabric to form, then impregnating the shrunk felt fabric with a heated solution of resinous substances comprising shellac and rosin, and finally drying under pressure the impregnated fabric.

5. The method of forming friction surfaces from a felt fabric, which consists in shrinking the felt fabric to form, then impregnating the shrunk felt fabric with a solution of resinous substances composed of shellac cut with alcohol and rosin cut with turpentine, and finally drying under pressure the impregnated fabric.

6. The method of forming friction surfaces from a felt fabric, which consists in shrinking the felt fabric to form, then impregnating the shrunk felt fabric with a heated solution of resinous substances composed of shellac cut with alcohol and rosin cut with turpentine, and finally drying under pressure the impregnated fabric.

7. A friction surface composed of a felt fabric, shrunk and compressed to form, and having the fibers and interstices of the fabric impregnated with a solution of resinous substances, becoming viscous under friction.

8. A friction surface composed of a felt fabric, shrunk and compressed to form, and having the fibers and interstices of the fabric impregnated with a solution of shellac cut with alcohol and rosin cut with turpentine, becoming viscous under friction.

PAUL H. FRANZ.

Witnesses:
FRANCIS L. MUNSON,
WILLIAM C. KINUM.